United States Patent [19]

Tetsuka

[11] Patent Number: 4,577,242
[45] Date of Patent: Mar. 18, 1986

[54] TAPE RECORDER HAVING A MECHANISM FOR PREVENTING ERRONEOUS SETTING TO A RECORDING MODE

[75] Inventor: Shigeo Tetsuka, Maebashi, Japan
[73] Assignee: Victor Company of Japan, Ltd., Japan
[21] Appl. No.: 634,034
[22] Filed: Jul. 24, 1984
[30] Foreign Application Priority Data Jul. 29, 1983 [JP] Japan .............................. 58-118479

[51] Int. Cl.⁴ ............................................. G11B 15/04
[52] U.S. Cl. ...................................................... 360/60
[58] Field of Search .................................. 360/60, 132

[56] References Cited

U.S. PATENT DOCUMENTS

| 3,677,556 | 7/1972 | Oosone | 360/60 |
| 3,997,916 | 12/1976 | Staar | 360/60 |
| 4,000,514 | 12/1976 | Fukatsu | 360/60 |
| 4,000,515 | 12/1976 | Fukawa | 360/60 |

FOREIGN PATENT DOCUMENTS 1433675 4/1976 United Kingdom ................... 360/60

*Primary Examiner*—Vincent P. Canney
*Attorney, Agent, or Firm*—Andrus, Sceales, Starke & Sawall

[57] ABSTRACT

A tape recorder comprises a tape moving direction setting mechanism for setting a tape moving mode of the tape recorder to a forward moving mode in which a tape within a loaded tape cassette moves in a forward direction or to a reverse moving mode in which the tape moves in a reverse direction, forward and reverse tab detecting members for detecting the existence of forward and reverse erroneous erasure preventing tabs of the tape cassette, and for directly blocking the displacement of a recording mode setting member which undergoes displacement responsive to the setting of the tape recorder to a recording mode when no tab is detected, and a setting mechanism operated responsive to the tape moving direction setting mechanism. The setting mechanism sets the tab detecting member which is not in correspondence with the tape moving mode set by the tape moving direction setting mechanism, in a state as if this tab detecting member is detecting the tab, that is, in a state of permitting the displacement of this tab detecting member.

6 Claims, 12 Drawing Figures

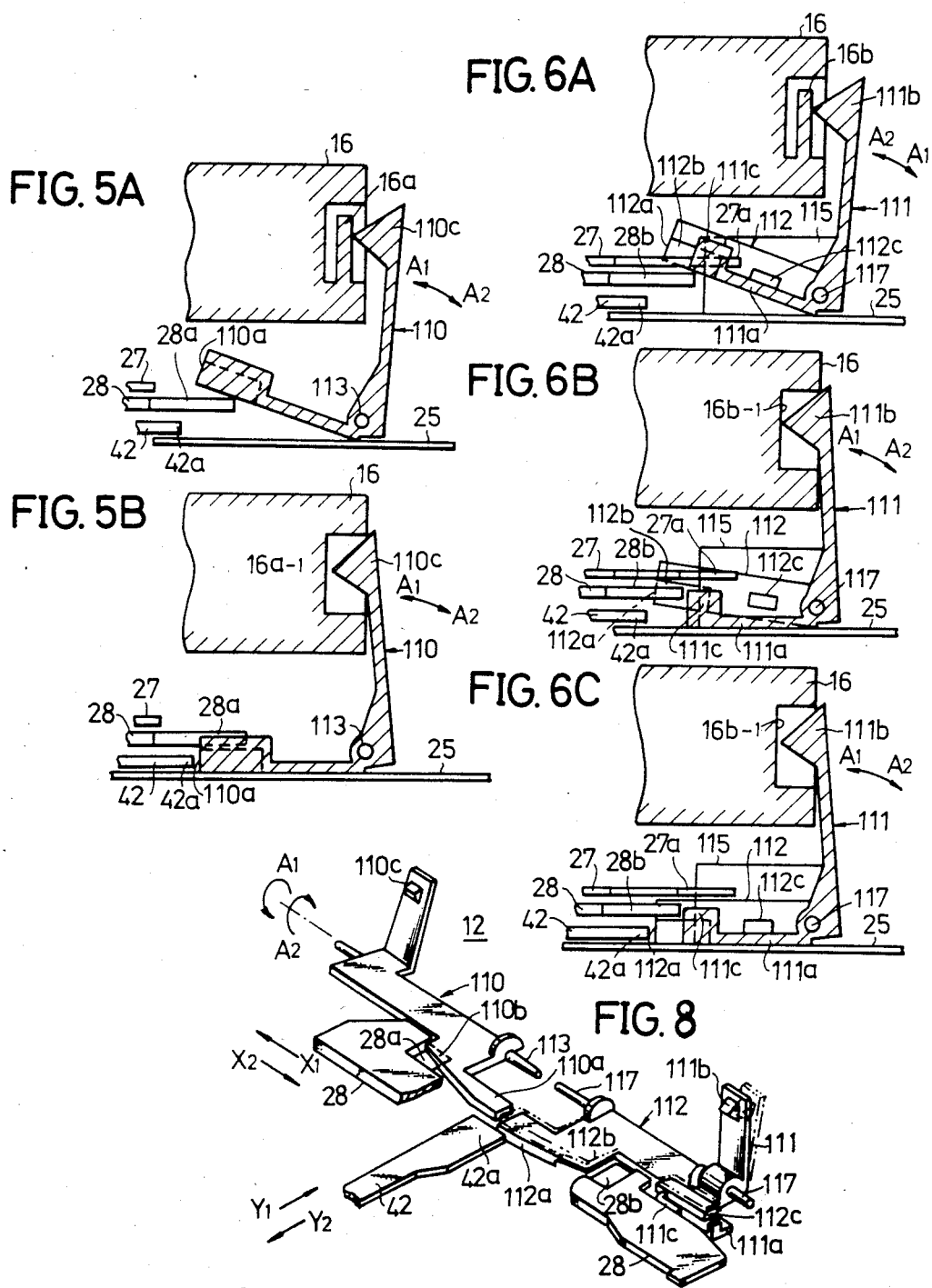

– 1 –

TAPE RECORDER HAVING A MECHANISM FOR PREVENTING ERRONEOUS SETTING TO A RECORDING MODE

BACKGROUND OF THE INVENTION

The present invention generally relates to tape recorders in which a tape is movable in two directions during a recording mode thereof, and more particularly to a tape recorder which is designed so that an operation of erroneously setting the tape recorder to the recording mode is prevented, in relation to a tape moving mode which is set and in relation to the existence of forward and reverse erroneous erasure preventing tabs of a loaded tape cassette.

In a general tape recorder of a first type in which only one side of a loaded tape cassette is playable unless the side of the tape cassette is reversed, the tape only moves in a forward direction during a recording mode. Thus, the operation to set the tape recorder to the recording mode is permitted or is prevented, by detecting the existence of a forward erroneous erasure preventing tab of the tape cassette. The operation of setting the tape recorder to the recording mode is prevented when the forward erroneous erasure preventing tab exists.

On the other hand, there is a tape recorder of a second type in which both sides of the loaded tape cassette are playable without reversing the side of the tape cassette. In this tape recorder, the tape moving direction is changed when an end of the tape is reached. In other words, the tape can move in the forward direction or in the reverse direction during the recording mode. Hence, the operation of setting this tape recorder to the recording mode is permitted or is prevented, by detecting the tape moving direction which is set and by detecting the existence of the forward or reverse erroneous erasure preventing tab which corresponds to the set tape moving direction.

A conventional erroneous recording preventing mechanism for preventing the operation of erroneously setting the tape recorder of the second type to the recording mode when the tape recorder should not assume the recording mode, is designed to detect the existence of the forward and reverse erroneous erasure prenenting tabs by a pair of tab detecting members. The tab detecting members are displaced responsive to the existence of the respective forward and reverse erroneous erasure preventing tabs. The displacements of the tab detecting members are transmitted through a plurality of transmitting members which are coupled to the tab detecting members, and a recording button is locked and is prevented from being pushed through the transmitting members. Hence, the conventional erroneous recording preventing mechanism requires a large number of parts, and the construction of the mechanism is complex. On the other hand, there is another erroneous recording preventing mechanism which employs switches. The switches are operated responsive to the displacements of the tab detecting members, and electrical signals from the switches are supplied to an electrical circuit. The pushing of the recording button is permitted or is prevented by a plunger which is activated responsive to an output signal of the electrical circuit. However, the manufacturing cost of this other erroneous recording preventing mechanism is high because of the use of the switch or the like.

SUMMARY OF THE INVENTION

Accordingly, it is a general object of the present invention to provide a novel and useful tape recorder in which a tape is movable in two directions during a recording mode thereof, in which the problems described heretofore are eliminated.

Another and more specific object of the present invention is to provide a tape recorder comprising an erroneous recording preventing mechanism which is designed so that a tab detecting member in correspondence with a set tape moving mode permits or prevents an operation of setting the tape recorder to a recording mode. The state of a forward tab detecting member for detecting a forward erroneous erasure preventing tab or a reverse tab detecting member for detecting a reverse erroneous erasure preventing tab, is set by a tape moving direction setting mechanism which sets the tape moving mode to a forward moving mode or a reverse moving mode, so that the tab detecting member which does not correspond to the set tape moving mode remains in the same state as when the erroneous erasure detecting tab is detected. Further, only the tab detecting member which corresponds to the set tape moving mode, is set to a state where the existence of the erroneous erasure preventing tab can essentially be detected. According to the tape recorder of the present invention, the construction of the erroneous recording preventing mechanism is simple as in the case of an erroneous recording preventing mechanism of a general tape recorder of the first type.

Still another object of the present invention is to provide a tape recorder comprising an erroneous recording preventing mechanism which uses parts of a pair of tab detecting members as stoppers for preventing the operation of setting the tape recorder to a recording mode. The stoppers are disposed adjacent to a lever which is displaced when a recording button is pushed, so as to oppose this lever. According to the tape recorder of the present invention, the number of parts of the erroneous recording preventing mechanism is kept to a minimum, and the erroneous recording preventing mechanism as a whole can be made compact.

Other objects and further features of the present invention will be apparent from the following detailed description when read in conjunction with the accompanying drawings.

BRIEF DESCRIPTION OF THE DRAWINGS

FIGS. 5A and 5B generally show states of a forward tab detecting member when an erroneous erasure preventing tab is detected and when the erroneous erasure preventing tab is not detected;

FIG. 6A shows a reverse tab detecting member and a tab detecting plate viewed from the direction of an arrow X1 in FIG. 1 in a state where the erroneous erasure detecting tab is detected, and FIGS. 6B and 6C show the reverse tab detecting member and the tab detecting plate viewed from the direction of the arrow X1 in FIG. 1 in a state where the erroneous erasure preventing tab is not detected;

FIG. 8 is a perspective view, with a part cut away, showing the erroneous recording preventing mechanism when the tape moving mode is set to a reverse moving mode.

DETAILED DESCRIPTION

Figure 1:
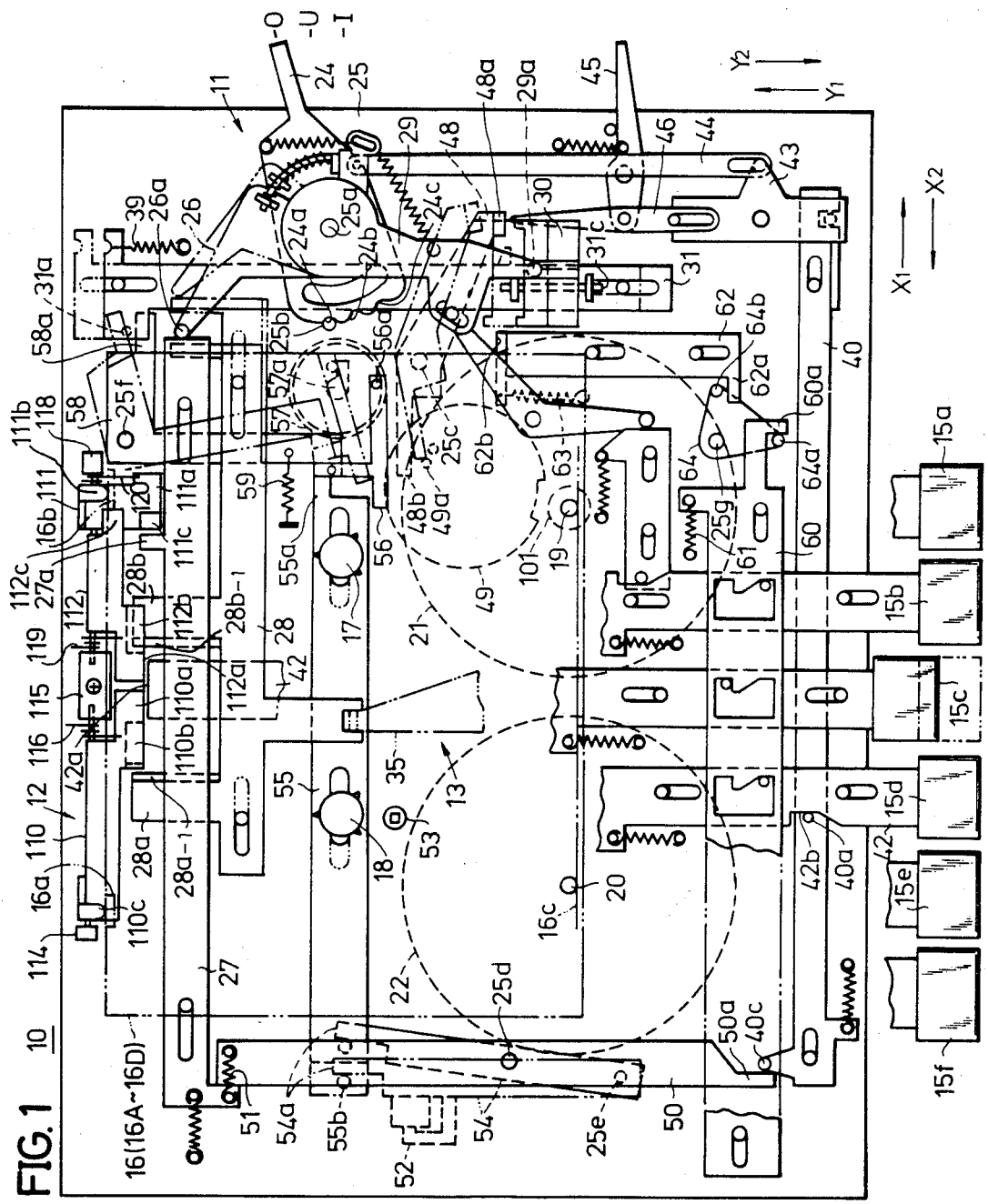
FIG. 1 is a plan view showing an embodiment of a tape recorder according to the present invention.

First, description will be given with respect to the general construction of a tape recorder 10 according to the present invention, by referring to FIGS. 1 through 3. The tape recorder 10 is of the second type in which both sides of the loaded tape cassette are playable without reversing the side of the tape cassette.

The tape recorder 10 generally comprises a tap moving mode selecting mechanism 11, an erroneous recording preventing mechanism 12 which constitutes an essential part of the present invention, and a tape moving direction setting mechanism 13. A pause button 15a, a fast-forward button 15b, a play button 15c, a recording button 15d, a rewind button 15e, and a stop button 15f are respectively arranged at the front of the tape recorder 10. As indicated by a two-dot chain line in FIG. 1, a tape cassette 16 is loaded into the tape recorder 10 in a state where a forward take-up reel shaft 17, a reverse take-up reel shaft 18, a forward capstan 19, and a reverse capstan 20 are respectively inserted into the loaded tape cassette 16.

Figure 3:
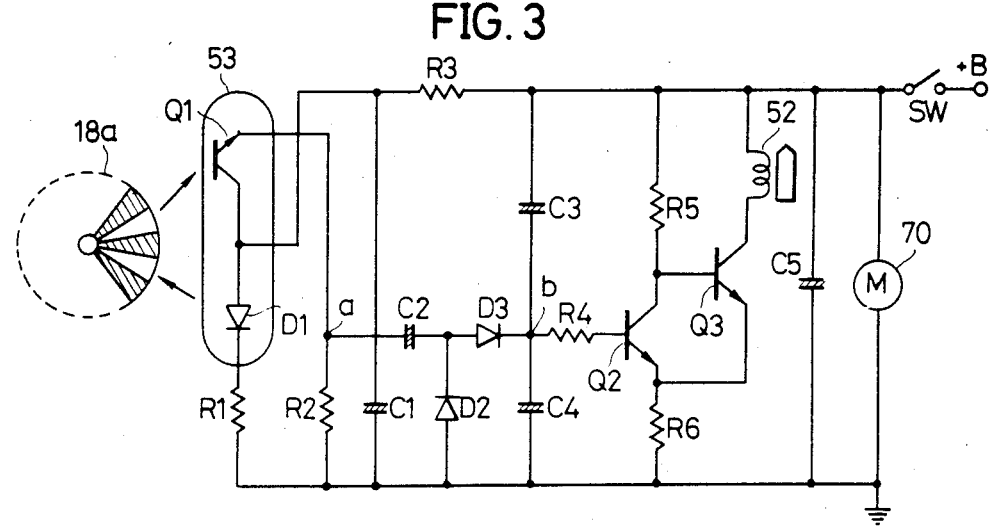
FIG. 3 is a circuit diagram showing a circuit for operating a solenoid when an end of a tape is reached.

The mode selecting mechanism 11 generally comprises a mode selecting lever 24, an operating arm 26, and a switchover arm 29 which are commonly supported by a shaft 25a which is located on a chassis 25 of the tape recorder 10, and a mode switching member 30, as shown in FIG. 3. This mode selecting mechanism 11 is described in detail in a United States patent application entitled "TAPE RECORDER HAVING A MECHANISM FOR MECHANICALLY CHANGING MODES" filed July, 1984 (filing date 7/6/84 U.S. Ser. No. 628,499) in which the assignee is the same as the assignee of the present application.

Mode determining depressions 24a, 24b, and 24c are formed at the tip end of the mode selecting lever 24. The mode selecting lever 24 is operated manually, and assumes an O-mode position O shown in FIG. 1 when the mode determining depression 24a engages with a pin 25b which is located on the chassis 25. The mode selecting lever 24 assumes a U-mode position U when the mode determining depression 24b engages with the pin 25b, and assumes an I-mode position I when the mode determining depression 24c engages with the pin 25b.

The O-mode refers to a tape moving mode of the tape recorder 10, in which the tape moving direction is alternately and repeatedly changed between a forward direction and a reverse direction and a head is rotated over one-half revolution with every change of the tape moving direction. The U-mode refers to a tape moving mode of the tape recorder 10, in which the tape moving direction is only changed to the reverse direction from the forward direction and the head is rotated over one-half revolution with the change of the tape moving direction. Further, the I-mode refers to a tape moving mode of the tape recorder 10, in which the tape moving in the forward or reverse direction is stopped when an end of a tape 16c is detected.

The erroneous recording preventing mechanism 12 will be described later on in the specification.

The mode switching member 30 essentially has a V-shape when viewed from the direction of an arrow Y1 in FIG. 1. A shaft 31c extending in the sliding direction of a support base 31, supports the mode switching member 30 on the support base 31. Thus, the mode switching member 30 can pivot about the shaft 31c, within a plane perpendicular to the sliding direction of the support base 31. An engaging pin 29a of the operating arm 29 engages with the mode switching member 30. The mode switching member 30 assumes a first state in which a tape moving direction changing mechanism opposing an operating lever 48 can be operated, and a second state in which a tape stopping mechanism opposing a stop mode lever 62 can be operated, depending on the rotational position of the operating arm 29.

A manual direction lever 45 is operated manually when the tape moving direction is to be changed while the tape 16c moves in one of the forward and reverse directions.

The operating lever 48 has a contact part 48a on one end thereof, and an engaging part 48b on the other end thereof. The tip end of a pushing lever 46 or the mode switching member 30 makes contact with the contact part 48a. The operating lever 48 is rotatably supported by a pin 25c which is located on the chassis 25. When the operating lever 48 rotates clockwise, the engaging part 48b pushes a pin 49a which is located on a gear wheel 49, and the gear wheel 49 is rotated clockwise so as to change the tape moving direction to the reverse direction as will be described later on in the specification. The gear wheel 49 has a teethless part over a predetermined angular range thereof, as shown in FIG. 1.

A recording mode rotary lever 50 is supported by a pin 25d which is located on the chassis 25. One end of the rotary lever 50 is coupled to a lever 27 by way of a spring 51. An engaging part 50a is formed on the other end of the rotary lever 50. This engaging part 50a engages with a pin 40c which is located on the recording mode detecting lever 40.

A mode switching solenoid 52 is energized when a tape end detecting element 53 detects an end of the tape 16c. One end of a rotary lever 54 is supported by a pin 25e which is located on the chassis 25, and this rotary lever 54 is rotated counterclockwise when the solenoid 52 is energized. The tape end detecting operation and a circuit for operating the solenoid 52 will be described later on in the specification. An engaging part 54a located at the tip end of the rotary lever 54, makes contact with a pin 55b which is located on the left end of a sliding lever 55. The sliding lever 55 is slidable in the directions of arrows X1 and X2. When the tape 16c moves in the forward direction, the forward take-up reel shaft 17 rotates an arm member (not shown) by way of a slip clutch (not shown), and the sliding lever 55 is moved in the direction of the arrow X1 by this arm member. On the other hand, when the tape 16c moves in the reverse direction, the reverse take-up reel shaft 18 rotates another arm member (not shown) by way of another slip clutch (not shown), and the sliding lever 55 is moved in the same direction of the arrow X1. A contact part 55a which is formed at the right end of the sliding lever 55, restricts a T-shaped arm 56 in a waiting state. The T-shaped arm 56 has a pin 56a which is engageable by a cam 57a of a cam gear wheel 57. The T-shaped arm 56 is rotatably coupled to the tip end of an L-shaped lever 58, and is urged to rotate counter-clockwise by the action of a torsion spring (not shown). The L-shaped lever 58 is supported by a pin 25f which is located on the chassis 25, and is urged to rotate clockwise by the action of a spring 59. The L-shaped lever 58 has an engaging part 58a which engages with a pin 31a located on the support base 31.

A lock plate 60 is urged in the direction of the arrow X2 by the action of a spring 61, and locks the buttons 15a through 15e which are pushed in the direction of the arrow Y1. The stop mode lever 62 is slidable in the directions of the arrows Y1 and Y2 and is urged in the direction of the arrow Y2 by the action of a spring 63. The stop mode lever 62 has an engaging part 62a located at one end thereof in the direction of the arrow Y2, and a contact part 62b located on the other end thereof in the direction of the arrow Y1. The mode switching member 30 makes contact with the contact part 62b. A transmitting member 64 is supported on a pin 25g which is located on the chassis 25. This transmitting member 64 has a pin 64a which engages with an engaging part 60a located on the right end of the lock plate 60, and a pin 64b which engages with the engaging part 62a of the stop mode lever 62.

Next, description will be given with respect to the tape moving direction setting mechanism 13 by referring to FIG. 2. Details of the tape moving direction setting mechanism 13 are disclosed in a U.S. patent aplication Ser. No. 610,247 entitled "TAPE RECORDER HAVING REVERSIBLE TAPE TRAVELING DIRECTION" May 14, 1984, in which the assignee is the same as the assignee of the present application.

Figure 2:
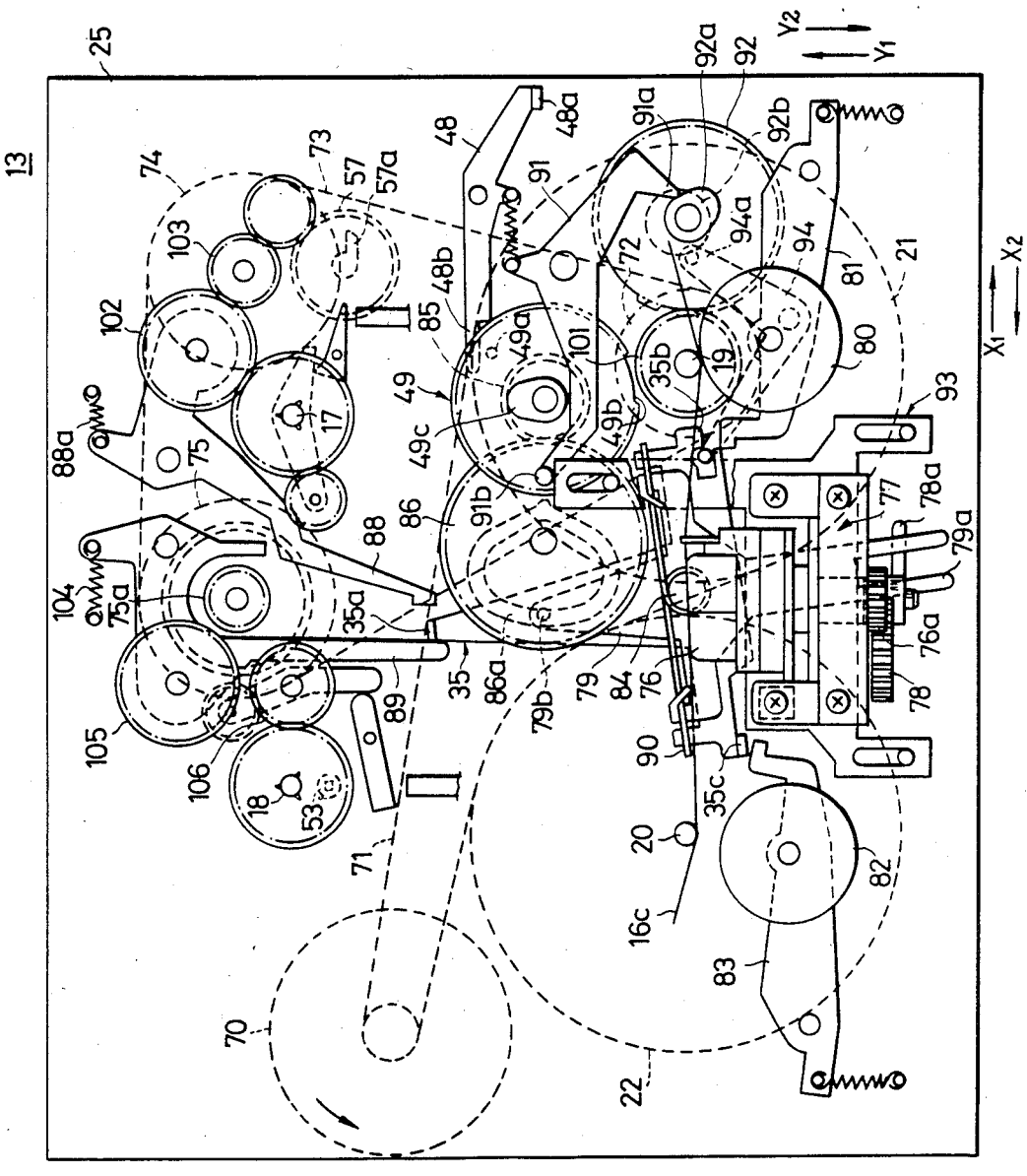
FIG. 2 is a plan view showing a tape moving direction setting mechanism in a forward moving mode.

In FIG. 2, a motor 70 rotates flywheels 21 and 22 by way of a belt 71. In addition, a pulley 72 which rotates unitarily with the take-up flywheel 21, rotates pulleys 74 and 75 by way of a belt 73. A magnetic head 76 is supported on a head holder 77. The magnetic head 76 has a head rotating gear wheel 76a which meshes with a fan-shaped gear wheel 78. A head rotating lever 79 is supported by a shaft 84. A forked engaging part 79a formed on one end of the head rotating lever 79, engages with an arm part 78a of the fan-shaped gear wheel 78. A pin 79b is located on the other end of the head rotating lever 79, and this pin 79b fits into a cam groove 86a of a head rotating cam gear wheel 86. The cam gear wheel 86 meshes with a small gear wheel 85 which is formed unitarily on the gear wheel 49. A gear ratio between the small gear wheel 85 and the cam gear wheel 86 is 1:2, and the small gear wheel 85 makes one revolution while the cam gear wheel 86 makes a one-half revolution.

The tape take-up drive system on the take-up reel side is selected and the tape moving direction is set to the forward direction, by rotating a rotary lever 35 which selects the tape moving direction, so that a contact part 35a located on the tip end thereof separates from a take-up lever 88 and makes contact with a supply lever 89. The rotary lever 35 is coaxially supported with the head rotating lever 79, and is coupled to the head rotating lever 79 through a torsion spring 90. In addition, the rotary lever 35 has a contact part 35b which makes contact with an arm 81 of a pinch roller 80 located on the take-up side, and a contact part 35c which makes contact with an arm 83 of a pinch roller 82 located on the supply side. A head pushing lever 91 has an arm part 91a which is in sliding contact with a cam 92a of a gear wheel 92 which has a teethless part over a predetermined angular range thereof. When the tape recorder 10 is set to the fast-forward or rewind mode, the gear wheel 92 rotates and the arm part 91a is pushed by the cam 92a, and an arm part 91b accordingly pushes a head base 93 in the direction of the arrow Y2. The head holder 77 is secured on the head base 93. An L-shaped lever 94 has an arm part 94a which is in sliding contact with a cam 92b of the gear wheel 92. When the tape recorder 10 is set to the fast-forward or rewind mode, only the rotary lever 35 is rotationally displaced to a neutral position responsive to the rotation of the gear wheel 92.

Next, description will be given with respect to the circuit which operates the solenoid 52, by referring to FIG. 3.

In FIG. 3, a switch SW closes when the play button 15c, the fast-forward button 15b, or the rewind button 15e is pushed, and the motor 70 starts to rotate responsive to the closing of the switch SW. When the motor 70 rotates, the tape 16c moves as will be described later on in the specification, and a disc 18a rotates unitarily with the reverse take-up reel shaft 18. A light reflecting part and a non-reflecting part are alternately arranged in the circumferential direction of the disc 18a. The tape end detecting element 53 comprising a light emitting diode D1 and a phototransistor Q1, detects the rotation of the disc 18a, and detection pulses from the tape end detecting element 53 are obtained at a connection point a. The detection pulses are converted into a D.C signal by diodes D2 and D3, and a D.C. voltage V is obtained at a connection point b. A transistor Q2 is ON and a transistor Q3 is OFF. The solenoid 52 is not energized and remains inoperative, because the transistor Q3 is OFF.

When an end of the tape 16c is reached, the disc 18a stops rotating, and no detection pulses are obtained at the connection point a. As a result, the D.C. voltage at the connection point b becomes zero. Hence, the transistor Q2 is turned OFF and the transistor Q3 is turned ON, and the solenoid 52 is energized and operated.

When the tape 16c starts to move in the reverse direction, the transistor Q2 is turned ON and the transistor Q3 is turned OFF, and the solenoid 52 is made inoperative. On the other hand, when the button 15c, 15b, or 15e which was pushed and assumes the operating position is returned to the original state, the switch SW opens and the solenoid 52 is made inoperative.

Next, description will be given with respect to the operation of the tape recorder 10 when the tape moving mode is set to the O-mode and the operating mode is set to the reproducing mode.

The mode selecting lever 24 is set to the position O, and the play button 15c is pushed and locked at the operating position by the lock plate 60, as shown in FIG. 1.

Because the mode selecting lever 24 is set to the position O, the mode switching member 30 assumes the first state. In addition, since the play button 15c is pushed and locked at the operating position, the switch SW is closed and the motor 70 rotates. The motor 70 rotates the capstan 19 counterclockwise, the capstan 20 clockwise, and both the pulleys 74 and 75 counterclockwise. The rotation of the pulley 74 is transmitted to the forward take-up reel shaft 17 through a gear 103 and a transmission gear 102, and the forward take-up reel shaft 17 is rotated counterclockwise.

Moreover, as shown in FIG. 2, the head rotating lever 79 rotates clockwise. The supply pinch roller 82 separates from the capstan 20, and the take-up pinch roller 80 presses against the capstan 19. Accordingly, the tape 16c within the tape cassette 16 moves in the forward direction, that is, in the direction of the arrow X1. The magnetic head 76 moves in the direction of the arrow Y1 and makes contact with the tape 16c. In other words, the tape recorder 10 assumes the forward reproduction mode in which the tape 16c moves in the forward direction.

In the forward reproduction mode of the tape recorder 10, the sliding lever 55 is slid in the direction of the arrow X1. The T-shaped arm 56 is engaged by the contact part 55a, and is restricted from being rotated counterclockwise by the action of a torsion spring (not shown). The pin 56a is positioned on the outside of a rotating locus of the cam 57a of the cam gear wheel 57 which rotates counterclockwise. Thus, the pin 56a is not engaged by the cam 57a, and the cam 57a rotates without engaging with the pin 56a.

When all of the tape 16c is taken up by the take-up reel shaft 17 and the forward reproduction is finished, the end of the tape 16c is detected by the tape end detecting element 53. Hence, the solenoid 52 is energized as described before, and the rotary lever 54 is rotated counterclockwise as indicated by a two-dot chain line in FIG. 1. The sliding lever 55 is moved in the direction of the arrow X2 responsive to this counterclockwise rotation of the rotary lever 54. When the sliding lever 55 moves in the direction of the arrow X2, the contact part 55a separates from the T-shaped arm 56. The T-shaped arm 56 disengages from the contact part 55a and is rotated counterclockwise by the action of a torsion spring (not shown), and the pin 56a enters within the rotating locus of the cam 57a. Accordingly, the pin 56a is engaged by the cam 57a, and the L-shaped lever 58 rotates counterclockwise and rotationally returns together with the T-shaped arm 56 as indicated by a two-dot chain line in FIG. 1. Due to the counterclockwise rotation of the L-shaped lever 58, the support base 31 temporarily returns in the direction of the arrow Y1 against the action of a spring 39, together with the mode switching member 30. The mode switching member 30 pushes and rotates the operating lever 48 counterclockwise.

Due to the counterclockwise rotation of the operating lever 48, the engaging part 48b pushes the pin 49a and rotates the gear wheel 49 counterclockwise, as shown in FIG. 2. Accordingly, a teethless part 49b of the gear wheel 49 deviates from the position opposing a driving gear wheel 101. As a result, the gear wheel 49 and the driving gear wheel 101, and the gear wheel 49 undergoes one revolution until the teethless part 49b again opposes the driving gear wheel 101. A cam 49c which is unitarily formed on the gear wheel 49, rotates the head pushing lever 91 counterclockwise over a predetermined angle. Consequently, the arm part 91b of the head pushing lever 91 moves the head base 93 in the direction of the arrow Y2, and the head base 93 is pushed back in the direction of the arrow Y2 to the head rotating position where the magnetic head 76 can be rotated.

The cam gear wheel 86 which meshes with the small gear wheel 85 on the gear wheel 49, rotates over an angle of approximately 180° as the gear wheel 49 undergoes one revolution, due to the gear ratio between the cam gear wheel 86 and the small gear wheel 85. Since the pin 79b of the head rotating lever 79 is fitted into the cam groove 86a of the cam gear wheel 86, the pin 79b moves along the cam groove 86a from the outer periphery to the inner periphery of the cam gear wheel 86 as the cam gear wheel 86 rotates counterclockwise, and the head rotating lever 79 rotates clockwise about the shaft 84.

In addition, the engaging part 79a of the head rotating lever 79 engages with the arm part 78a of the fan-shaped gear wheel 78, and rotates the fan-shaped gear wheel 78 clockwise. Thus, the magnetic head 76 makes a one-half revolution within the head holder 77, together with the gear wheel 76a.

The rotary lever 35 rotates clockwise unitarily with the head rotating lever 79, by the action of the torsion spring 90. Accordingly, the contact part 35a of the rotary lever 35 separates from the supply lever 89 and makes contact with the take-up lever 88. The take-up lever 89 is rotated counterclockwise against the action of a spring 88a, and separates the transmitting gear wheel 102 from the forward take-up reel shaft 17 and the gear wheel 103. The take-up lever 89 which is released from the restriction by the engaging part 35a, rotates counterclockwise due to the action of a spring 104. When the take-up lever 89 rotates counterclockwise, a transmitting gear 105 is caused to mesh with a gear wheel 106 which meshes with the reverse take-up reel shaft 18, and to mesh with a gear wheel 75a which is formed unitarily on the pulley 75. As a result, a tape take-up drive system for moving the tape 16c in the reverse direction, is formed by the gear 75a, the transmitting gear 105, the gear 106, and the reverse take-up reel shaft 18.

Due to the clockwise rotation of the rotary lever 35, the contact part 35b makes contact with the arm 81 so as to rotate the arm 81 counterclockwise. Further, the contact part 35c separates from the arm 83 so as to rotate the arm 83 counterclockwise. For this reason, the pinch roller 80 separates from the capstan 19, and the pinch roller 82 presses against the capstan 20 through the tape 16c.

When the cam 49c of the gear wheel 49 undergoes one revolution, the head pushing lever 91 rotates clockwise. Hence, the head base 93 moves in the direction of the arrow Y1, and the magnetic head 76 makes contact with the tape 16c.

Accordingly, the tape 16c is driven in a state pinched between the pinch roller 82 and the capstan 20, and is taken up by the take-up reel shaft 18. The tape 16c moves in the reverse direction indicated by the arrow X2, and the reverse track is formed on the tape 16c by the magnetic head 76.

In other words, the tape recorder 10 performs a direction changing operation when the end of the tape 16c is detected, and assumes the reverse reproduction mode.

When the tape 16c starts to move in the reverse direction, the solenoid 52 is made inoperative as described before. The sliding lever 55 slides in the direction of the arrow X1, and the T-shaped arm 56 and the L-shaped lever 58 resume the original states indicated by the solid lines in FIG. 1. In addition, the operating arm 26 is pushed and rotated clockwise by the tape moving direction detecting lever 28, but the switchover arm 29 is restricted from rotating clockwise by the mode selecting lever 24 which is set at the position O. Hence, the switchover arm 29 remains in the original position and does not rotate, and the mode switching member 30 remains in the first state.

When the end of the tape 16c is detected when the tape recorder 10 assumes the reverse reproduction mode, the tape recorder 10 operates substantially in the same manner as when the end of the tape 16c is detected during the forward reproduction mode. The operating lever 48 is pushed and rotated by the mode switching member 30, and the tape driving mechanism and the magnetic head rotating mechanism operate and return to the respective states shown in FIG. 2. In other words, the tape recorder 10 performs a direction changing operation and assumes the forward reproduction mode.

Therefore, the tape recorder 10 performs a direction changing operation every time the end of the tape 16c is detected, and alternately assumes the forward reproduction mode and the reverse reproduction mode.

Next, when the mode selecting lever 24 is set to the position U and the tape moving mode is accordingly set to the U-mode, the tape recorder operates as follows.

That is, when the end of the tape 16c is detected during the forward reproduction mode, the support base 31 moves in the direction of the arrow Y1 together with the mode switching member 30 and rotates the operating lever 48, as in the case described before. Accordingly, the mechanism shown in FIG. 2 operates, and the tape recorder 10 performs the direction changing operation, so as to change the operating mode of the tape recorder 10 to the reverse reproduction mode.

When the tape moving direction changes to the reverse direction, the tape moving direction detecting lever 28 moves in the direction of the arrow X2, and the operating arm 26 rotates clockwise. In this state, the mode selecting lever 24 is set to the position U, and the switchover arm 29 can rotate clockwise. For this reason, the switchover arm 29 is rotated clockwise responsive to the clockwise rotation of the operating arm 26. The mode switching member 30 rotates and assumes the second state.

Accordingly, when the end of the tape 16c is detected during the reverse reproduction mode, the mode switching member 30 moves the stop mode lever 62 in the direction of the arrow Y2. Thus, the lock plate 60 is moved in the direction of the arrow X1 through the transmitting member 64, and the locking with respect to the play button 15c in the operating position is cancelled. The play button 15c returns to the original position, and the tape recorder 10 assumes the stop mode.

Next, description will be given with respect to the erroneous recording preventing mechanism 12, by referring to FIGS. 1 and 4.

A forward tab detecting member 110 and an L-shaped reverse tab detecting member 111 are provided at the rear of the tape recorder 10. The forward tab detecting member 110 is designed to detect the existence of a forward erroneous erasure preventing tab (hereinafter simply referred to as a forward tab) 16a of the tape cassette 16. The forward tab 16a in its non-existence prevents the erroneous erasure when the tape 16c moves in the forward direction. On the other hand, the reverse tab detecting member 111 is designed to detect the existence of a reverse erroneous erasure preventing tab (hereinafter simply referred to as a reverse tab) 16b of the tape cassette 16. The reverse tab 16b in its non-existence prevents the erroneous erasure when the tape 16c moves in the reverse direction. A tab detecting plate 112 is linked to the reverse tab detecting member 111.

The forward tab detecting member 110 has a shaft 113 which projects on both sides thereof. The shaft 113 is supported by bearings 114 and 115, and the forward tab detecting member 110 is urged to rotate in the direction of an arrow A1 in FIG. 4 by the action of a spring 116. The tab detecting plate 112 has a shaft 117 which projects on both sides thereof. This shaft 117 is supported by the bearing 115 and a bearing 118, and the tab detecting plate 112 is urged to rotate in the direction of the arrow A1 by the action of a spring 119. The reverse tab detecting member 111 is supported by the shaft 117, and is urged to rotate in the direction of the arrow A1 by the action of a spring 120. A horizontal arm part 111a of the reverse tab detecting member 111 is located below an arm part 112c of the tab detecting plate 112. The forward tab detecting member 110 has a stopper 110a at the tip end thereof, and the tab detecting plate 112 has a stopper 112a at the tip end thereof.

The forward tab detecting member 110, the reverse tab detecting member 111, and the tab detecting plate 112, are pivotally supported along a common axis in the direction of the arrow X1 in a state where the stoppers 110a and 112a are adjacent to each other. The adjacent stoppers 110a and 112a are substantially at the center with respect to the width direction (the direction of the arrow X1) of the tape recorder 10. The stoppers 110a and 112a are located at positions such that the stoppers 110a and 112a normally oppose a tip end 42a of a recording mode lever 42 which slides in the direction of the arrow Y1 when the recording button 15d is pushed, and such that the stoppers 110a and 112a are above the tip end 42a of the recording mode lever 42 when the forward tab detecting member 110 and the tab detecting plate 112 rotate in the direction of an arrow A2. The stoppers 110a and 112a do not interfere with the sliding movement of the recording mode lever 42 in the direction of the arrow Y1 when the the forward tab detecting member 110 and the tab detecting plate 112 are rotated in the direction of the arrow A2. The forward tab detecting member 110 further has an extending part 110b, and the tab detecting plate 112 further has an extending part 112b.

A slide lever 28 is slidably provided on the chassis 25 in relation to the forward tab detecting member 110 and the tab detecting plate 112. This slide lever 28 has arm parts 28a and 28b which act on the respective extending parts 110b and 112b of the forward tab detecting member 110 and the tab detecting plate 112. The slide lever 28 is engaged with the rotary lever 35. When the tape moving direction setting mechanism 13 is set to the forward moving mode, the slide lever 28 is moved in the direction of the arrow X2 as shown in FIGS. 1 and 4. On the other hand, when the tape moving direction setting mechanism 13 is set to the reverse moving mode, the slide lever 28 moves in the direction of the arrow X1. The arm parts 28a and 28b of the slide lever 28 enter underneath the respective extending parts 110b and 112b, depending on the position of the slide lever 28. In order to ensure smooth entry of the arm parts 28a and 28b underneath the respective extending parts 110b and 112b, the side edge of the arm part 28a is formed as a sloping surface 28a-1 and the side edge of the arm part 28b is formed as a sloping surface 28b-1. Similarly, the respective side edges of the extending parts 110b and 112b are also formed as sloping surfaces.

Next, description will be given with respect to the operation of the erroneous recording preventing mechanism 12, by referring to FIGS. 5A through 9. The description will be given separately for the case where the tape moving direction setting mechanism 13 is set to the forward moving mode, and for the case where the tape moving direction setting mechanism 13 is set to the reverse moving mode.

Figure 4:
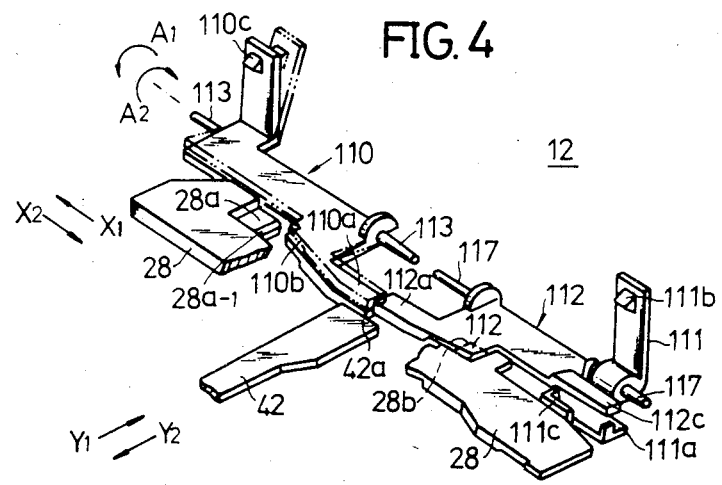
FIG. 4 is a perspective view, with a part cut away, showing an erroneous recording preventing mechanism in the tape recorder shown in FIG. 1.

In a case (I) where the tape moving direction setting mechanism 13 is set to the forward moving mode as shown in FIG. 2, the slide lever 28 is moved in the direction of the arrow X1 as shown in FIGS. 1 and 4. The arm part 28a is separated from the extending part 110b, and the arm part 28b is entered beneath the extending part 112b. Accordingly, the forward tab detecting member 110 is rotated in the direction of the arrow A1, and the stopper 110a makes contact with the top of the chassis 25. The stopper 110a opposes the tip end 42a of the recording mode lever 42, and blocks the movement of the recording mode lever 42 in the direction of the arrow Y1. In other words, the stopper 110a assumes the operated position where the operation of setting the tape recorder 10 to the recording mode is prevented. On the other hand, the tab detecting plate 112 is pushed upwardly by the arm part 28b, and is rotated in the direction of the arrow A2. Hence, the stopper 112a is raised from the operated position opposing the tip end 42a of the recording mode lever 42 up to the inoperative position. When stopper 112a assumes this inoperative position, the recording mode lever 42 is movable in the direction of the arrow Y1, and it is possible to perform the operation of setting the tape recorder 10 to the recording mode.

In a case (I-a) where a loaded tape cassette 16A has both the tabs 16a and 16b, a detecting part 110c of the forward tab detecting member 110 makes contact with the forward erroneous erasure detecting tab 16a, as shown in FIG. 5A. The forward tab detecting member 110 rotates in the direction of the arrow A2 as indicated by a two-dot chain line in FIG. 4, and the stopper 110a is raised and assumes the inoperative position. Hence, both the stoppers 110a and 112a assume the respective inoperative positions, and in this state, it is possible to perform the operation of setting the tape recorder 10 to the recording mode.

When the recording button 15d is pushed together with the play button 15c, the recording mode lever 42 slides in the direction of the arrow Y1 below the stoppers 110a and 112a which are in the inoperative positions, and the buttons 15d and 15c are locked in the respective operating positions. The tape 16c moves in the forward direction, and the tape recorder 10 assumes the recording mode.

In this state, a detecting part 111b of the reverse tab detecting member 111 makes contact with the reverse erroneous erasure detecting tab 16b. Thus, the reverse tab detecting member 111 rotates in the direction of the arrow A2 in FIG. 6A, and a projection 111c located at the tip end of the arm part 111a rises so as to oppose an arm part 27a of the lever 27.

Figure 7:
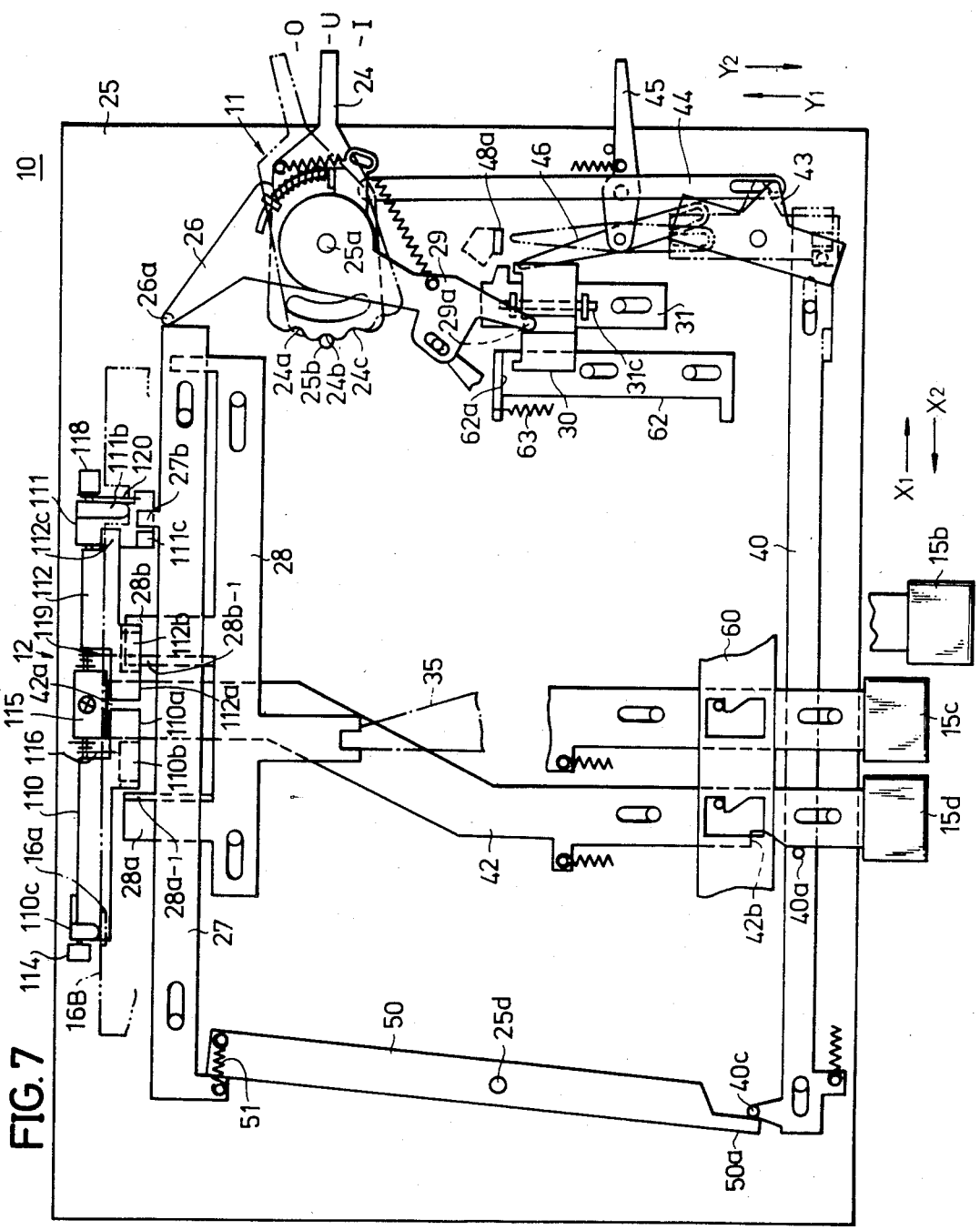
FIG. 7 is a plan view showing the tape recorder in a state where an operation of setting the tape recorder to a recording mode is performed when a tape moving mode is set to a forward moving mode and a loaded tape cassette has a forward erroneous erasure preventing tab but does not have a reverse erroneous erasure preventing tab.

The recording mode detecting lever 40 moves in the direction of the arrow X2 against the action of a spring 41 as shown in FIG. 7, responsive to the pushing of the recording button 15d. A connecting lever 43 rotates clockwise, and a rod 44 moves in the direction of the arrow Y2. Hence, the mode selecting lever 24 is rotated clockwise by the rod 44, and the mode selecting lever 24 is set to the position U where the pin 25b fits into the depression 24b.

In a case (I-b) where a loaded tape cassette 16B has the forward tab 16a but does not have the reverse tab 16b as shown in FIG. 7, the forward tab detecting member 110 detects the forward tab 16a. As in the case (I-a) described before, the forward tab detecting member 110 assumes the state shown in FIG. 5A and indicated by the two-dot chain line in FIG. 4. Thus, the stopper 110a assumes the inoperative position. The reverse tab detecting member 111 assumes the state shown in FIGS. 6B and 7. In this state, the detecting part 111b enters within a depression 16b-1 which is formed due to the non-existence of the reverse tab 16b of the tape cassette 16B. The projection 111c assumes a position lower than the position of the arm part 27a. The stopper 112a assumes the inoperative position. Accordingly, the erroneous recording preventing mechanism 12 is in a state of permitting the operation of setting the tape recorder 10 to the recording mode, and the tape recorder 10 assumes the recording mode when this setting operation is performed.

When the operation of setting the tape recorder 10 to the recording mode is performed, the recording mode detecting lever 40 moves in the arrow X2. Hence, the recording mode rotary lever 50 rotates clockwise, and the lever 27 is urged in the direction of the arrow X1 by the action of the spring 51. Since the projection 111c does not oppose the arm part 27a, the lever 27 is not engaged by the projection 111c, and moves in the direction of the arrow X1. The lever 27 pushes a contact part 26a of the operating arm 26, and rotates the operating arm 26 clockwise. Due to the clockwise rotation of the operating arm 26, the switchover arm 29 rotates clockwise, and the mode switching member 30 rotates counterclockwise when viewed from the direction of the arrow Y1 so as to assume the second state. As a result, when the end of the tape 16c is detected as the tape 16c moves in the forward direction, the stop mode lever 62 is engaged by the mode switching member 30 and is moved in the direction of the arrow Y1. As in the case described before, the lock plate 60 moves in the direction of the arrow X1, and the locking with respect to the play button 15c and the recording button 15d is cancelled. The tape recorder 10 then assumes the stop mode.

In a case (I-c) where a loaded tape cassette 16C does not have the forward tab 16a but has the reverse tab 16b, the detecting part 110c of the forward tab detecting member 110 enters within a depression 16a-1 which is formed due to the non-existence of the forward tab 16a, as shown in FIG. 5B. The forward tab detecting member 110 is rotated in the direction of the arrow A1. The stopper 110a assumes the operating position opposing the tip end 42a of the recording mode lever 42. On the other hand, the reverse tab detecting member 111 detects the reverse tab 16b, and the stopper 112a assumes the inoperative position as shown in FIG. 6A.

Accordingly, the erroneous recording preventing mechanism 12 prevents the operation of setting the tape recorder 10 to the recording mode, by blocking the recording mode lever 42 from moving in the direction of the arrow Y1 by the stopper 110a. Consequently, it is possible to positively prevent the tape recorder 10 from being erroneously set to the recording mode.

In a case (I-d) where a loaded tape cassette 16D does not have the tabs 16a and 16b, the forward tab detecting member 110 assumes the state shown in FIG. 5A as in the case (I-c) described before, and the reverse tab detecting member 111 and the tab detecting plate 112 assume the state shown in FIG. 6B as in the case (I-b) described before. Hence, the operation of setting the tape recorder 10 to the recording mode is prevented by the stopper 110a.

Figure 9:
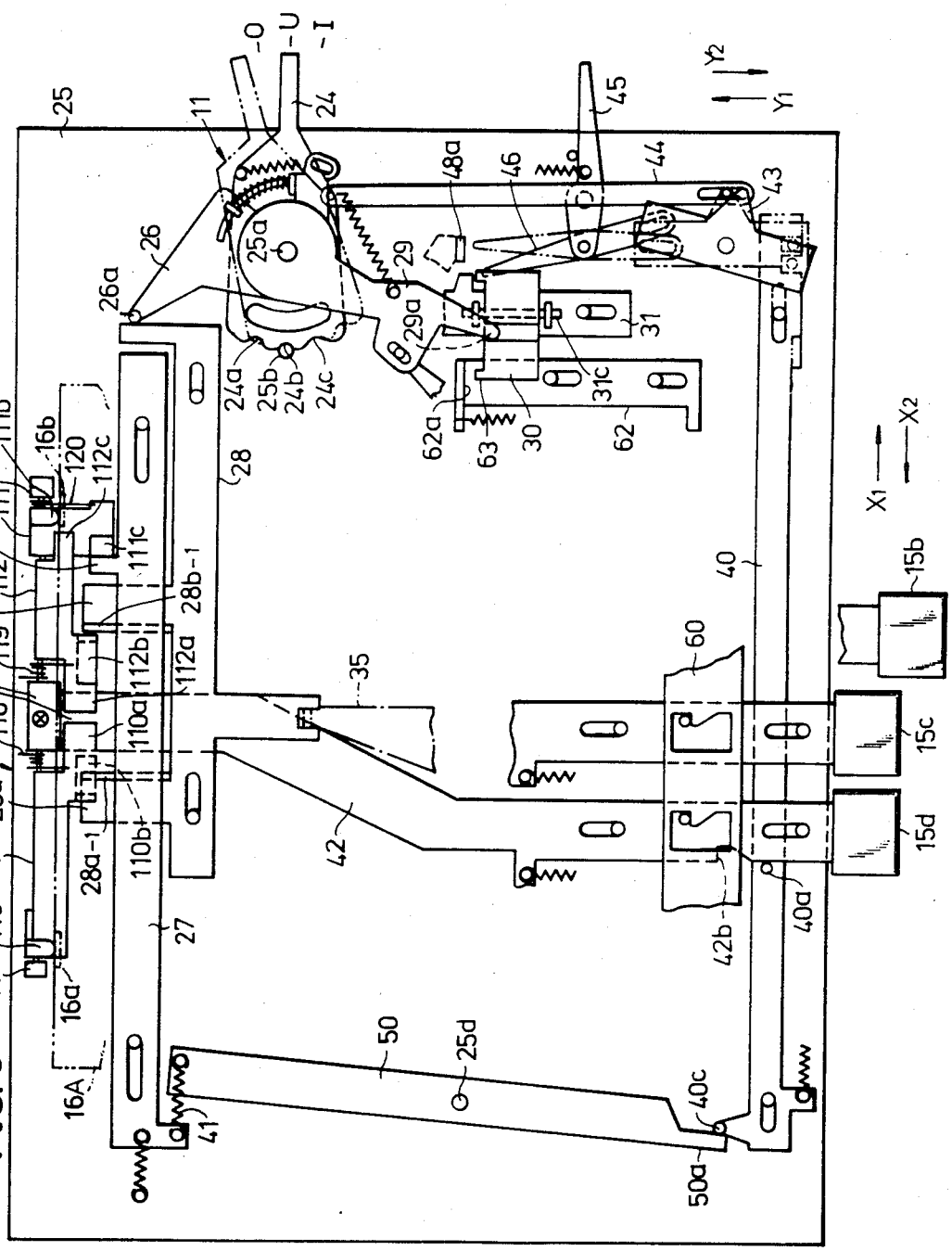
FIG. 9 is a plan view showing the tape recorder in a state where the operation of setting the tape recorder to the recording mode is performed when the tape moving mode is set to the reverse moving mode and the loaded tape cassette has the forward erroneous erasure preventing tab and the reverse erroneous erasure preventing tab.

Next, in a case (II) where the tape moving direction setting mechanism 13 is set to the reverse moving mode, the rotary lever 35 is rotated clockwise with respect to the position shown in FIG. 2. The slide lever 28 is moved in the direction of the arrow X2 as shown in FIGS. 8 and 9. The arm part 28b is separated from the extending part 112b, and the arm part 28a is entered beneath the extending part 110b. Accordingly, the tab detecting plate 112 is rotated in the direction of the arrow A1, and the stopper 112a makes contact with the top of the chassis 25. The stopper 112a opposes the tip end 42a of the recording mode lever 42, and blocks the movement of the recording mode lever 42 in the direction of the arrow Y1. In other words, the stopper 112a assumes the operated position where the operation of setting the tape recorder 10 to the recording mode is prevented. On the other hand, the forward tab detecting member 110 is pushed upwardly by the arm part 28a, and is rotated in the direction of the arrow A2. Hence, the stopper 110a is raised from the operated position opposing the tip end 42a of the recording mode lever 42 up to the inoperative position. When stopper 110a assumes this inoperative position, the recording mode lever 42 is movable in the direction of the arrow Y1, and it is possible to perform the operation of setting the tape recorder 10 to the recording mode.

A case (II-a) where the loaded tape cassette 16A has both the tabs 16a and 16b, the detecting part 111b of the reverse tab detecting member 111 makes contact with the reverse erroneous erasure detecting tab 16b, as shown in FIG. 6A. The reverse tab detecting member 111 and the tab detecting plate 112 rotate in the direction of the arrow A2 as indicated by two-dot chain lines in FIG. 8, and the stopper 112a is raised and assumes the inoperative position. The forward tab detecting member 110 detects the forward tab 16a, and assumes the state shown in FIG. 5A. Hence, both the stoppers 110a and 112a assume the respective inoperative positions, and in this state, it is possible to perform the operation of setting the tape recorder 10 to the recording mode.

When the recording button 15d is pushed together with the play button 15c, the recording mode lever 42 slides in the direction of the arrow Y1 below the stoppers 110a and 112a which are in the inoperative positions, and the buttons 15d and 15c are locked in the respective operating positions. The tape 16c moves in the reverse direction, and the tape recorder 10 assumes the recording mode.

In the case where the tape moving mode of the tape recorder 10 is set to the O-mode, the tape moving mode is changed to the U-mode when the operation mode is set to the recording mode, as in the case (I-a) described before.

In a case (II-b) where the loaded tape cassette 16B has the forward tab 16a but does not have the reverse tab 16b, the forward tab detecting member 110 detects the forward tab 16a and assumes the state shown in FIG. 5A as in the case (II-a) described before. The detecting part 111b of the reverse tab detecting member 111 enters into the depression 16b-1 as shown in FIG. 6C, and is rotated in the direction of the arrow A1. The tab detecting plate 112 is rotated in the direction of the arrow A1. The stopper 112a makes contact with the top of the chassis 25, and assumes the operating position opposing the tip end 42a of the lever 42. Accordingly, the stopper 112a blocks the lever 42 from moving in the direction of the arrow Y1, so as to prevent the operation of setting the tape recorder 10 to the recording mode.

In a case (II-c) where the loaded tape cassette 16C does not have the forward tab 16a but has the reverse tab 16b, the reverse tab detecting member 111 and the tab detecting plate 112 assume the state shown in FIG. 6A, as in the case (II-a) described before. The stopper 112a assumes the inoperative position. On the other hand, the forward tab detecting member 110 assumes the state shown in FIG. 8. As a result, both the stoppers 112a and 110a assume the respective inoperative positions, and the erroneous recording preventing mechanism permits the operation of setting the tape recorder 10 to the recording mode.

In a case (II-d) where the loaded tape cassette 16D does not have the tabs 16a and 16b, the forward tab detecting member 110 assumes the state shown in FIG. 8 as in the case (II-c) described above, and the reverse tab detecting member 111 and the tab detecting plate 112 assume the state shown in FIG. 6C as in the case (II-b) described before. Thus, the stopper 112a of the erroneous recording preventing mechanism 12 positively prevents the operation of setting the tape recorder 10 to the recording mode.

Further, the present invention is not limited to these embodiments, but various variations and modifications may be made without departing from the scope of the present invention.

What is claimed is:

1. A tape recorder comprising:

a tape moving direction setting mechanism for setting a tape moving mode of said tape recorder to a forward moving mode in which a tape within a loaded tape cassette moves in a forward direction or to a reverse moving mode in which the tape moves in a reverse direction;

a recording mode setting member which has an elongated shape and is displaced by a manual operation of setting an operation mode of said tape recorder to a recording mode;

a forward tab detecting member for detecting the existence of a forward erroneous erasure preventing tab of the loaded tape cassette, said forward tab detecting member having a first stopper which assumes an operating position where said first stopper opposes a tip end of said recording mode setting member so as to restrict the displacement of said recording mode setting member when said forward tab detecting member does not detect said forward erroneous erasure preventing tab, said first stopper assuming an inoperative position where said first stopper does not interfere with the displacement of said recording mode setting member when said forward tab detecting member detects said forward erroneous erasure preventing tab;

a reverse tab detecting member for detecting the existence of a reverse erroneous erasure preventing tab of the loaded tape cassette, said reverse tab detecting member having a second stopper which assumes an operating position where said second stopper opposes the tip end of said recording mode setting member so as to restrict the displacement of said recording mode setting member when said reverse tab detecting member does not detect said reverse erroneous erasure preventing tab, said second stopper assuming an inoperative position where said second stopper does not interfere with the displacement of said recording mode setting member when said reverse tab detecting member detects said reverse erroneous erasure preventing tab; and an operating member which is displaced responsive to the setting operation of said tape moving direction setting mechanism, said operating member acting on said reverse tab detecting member so that said second stopper assumes the inoperative position when the tape moving mode is set to said forward moving mode, and acting on said forward tab detecting member so that said first stopper assumes the inoperative position when the tape moving mode is set to said reverse moving mode.

2. A tape recorder as claimed in claim 1 in which said forward tab detecting member and said reverse tab detecting member are arranged so that said first and second stoppers are adjacent to each other, and said tip end of said recording mode setting member is simultaneously opposed by both said first and second stoppers when said first and second stoppers assume the respective operating positions.

3. A tape recorder as claimed in claim 1 which further comprises a chassis, said recording mode setting member is slidable on a top of said chassis rearwardly of said tape cassette when said recording mode setting member is manually operated, said forward and reverse tab detecting members are pivotally supported along a common axis extending perpendicularly to a direction in which said recording mode setting member is slidable, said first and second stoppers make contact with the top of said chassis in the respective operating positions so as to restrict the rearward sliding of said recording mode setting member, and said first and second stoppers rise and separate from the top of said chassis to assume the respective inoperative positions responsive to rotations of said forward and reverse tab detecting members when the respective erroneous erasure preventing tabs are detected.

4. A tape recorder as claimed in claim 1 in which said operating member assumes a first position when the tape moving mode is set to said forward moving mode by said tape moving direction setting mechanism and assumes a second position when the tape moving mode is set to said reverse moving mode, said operating member comprises a first engaging part for acting on said forward tab detecting member and a second engaging part for acting on said reverse tab detecting member, said first engaging part disengages from said forward tab detecting member and said second engaging member acts on said reverse tab detecting member when said operating member assumes said first position, and said first engaging part acts on said forward tab detecting member and said second engaging part disengages from said reverse tab detecting member when said operating member assumes said second position.

5. A tape recorder as claimed in claim 1 which further comprises a predetermined mechanism which is selectively set so as to change the tape moving direction or stop the movement of the tape when an end of the tape is detected, and a setting member which is displaced responsive to the manual operation of said recording mode setting member, for setting said predetermined mechanism to a state where said predetermined mechanism stops the movement of the tape, and said reverse tab detecting member has a third stopper for restricting the displacement of said setting member when said reverse tab detecting member detects said reverse erroneous erasure preventing tab of the tape cassette.

6. A tape recorder as claimed in claim 1 in which said first stopper and said second stopper are a part of said forward tab detecting member and said reverse tab detecting member, respectively.

* * * * *

UNITED STATES PATENT AND TRADEMARK OFFICE
CERTIFICATE OF CORRECTION

PATENT NO. : 4,577,242
DATED : March 18, 1986
INVENTOR(S) : SHIGEO TETSUKA

It is certified that error appears in the above-identified patent and that said Letters Patent is hereby corrected as shown below:

Column 16, Line 35, After "cassette", and before the period, insert---and for permitting the displacement of said setting member when said reverse tab detecting member does not detect said reverse erroneous erasure preventing tab of the tape cassette---

Signed and Sealed this

Twenty-second Day of July 1986

[SEAL]

Attest:

DONALD J. QUIGG

Attesting Officer

Commissioner of Patents and Trademarks